United States Patent [19]

Wallace

[11] Patent Number: 4,938,360
[45] Date of Patent: Jul. 3, 1990

[54] SEALED CUSHIONING PACKAGE

[75] Inventor: Robert S. Wallace, 823 South Longwood Ave., Los Angeles, Calif. 90005

[73] Assignees: Robert S. Wallace, Los Angeles; Jack Bauman, Pacific Palisades, both of Calif.; part interest to each

[21] Appl. No.: 308,314

[22] Filed: Feb. 9, 1989

[51] Int. Cl.⁵ .................. B65D 81/06; B65D 81/10
[52] U.S. Cl. .................... 206/586; 206/591; 206/594; 220/354; 220/358
[58] Field of Search ............ 224/202, 207; 220/356, 220/357, 358; 206/585, 594, 586–593, 523, 521; 215/320, 344

[56] References Cited

U.S. PATENT DOCUMENTS

| | | |
|---|---|---|
| D. 213,157 | 1/1969 | Wallace . |
| 2,606,708 | 8/1952 | Irvan .................... 220/356 |
| 2,732,870 | 1/1956 | Nichols .................. 220/356 |
| 2,860,768 | 11/1958 | Smithers . |
| 3,181,766 | 5/1965 | Kane . |
| 3,200,943 | 8/1965 | Waterbury . |
| 3,273,779 | 9/1966 | Mykleby . |
| 3,409,006 | 11/1968 | Getti . |
| 3,495,787 | 2/1970 | Wallace . |
| 3,501,084 | 3/1970 | Harrison . |
| 3,509,005 | 4/1970 | Hartig . |
| 3,584,738 | 4/1969 | Wallace . |
| 3,604,556 | 1/1970 | Schwartz . |
| 3,613,871 | 6/1970 | Evans . |
| 3,627,113 | 2/1970 | DiIola . |
| 3,664,492 | 5/1972 | Wallace . |
| 3,773,272 | 11/1973 | Wallace . |
| 3,856,235 | 12/1974 | Wallace . |
| 4,166,499 | 9/1979 | Schutz et al. .............. 220/356 X |
| 4,241,829 | 12/1980 | Hardy . |
| 4,406,369 | 9/1983 | Wallace . |
| 4,538,741 | 9/1985 | Jacobs ..................... 215/320 |
| 4,696,401 | 9/1987 | Wallace ................... 206/594 |

FOREIGN PATENT DOCUMENTS

| | | |
|---|---|---|
| 0002416 | 5/1978 | European Pat. Off. . |
| 002416 | 6/1979 | European Pat. Off. ....... 206/594 |
| 0086542 | 11/1983 | European Pat. Off. . |
| 3527616 | 2/1987 | Fed. Rep. of Germany ....... 206/5.1 |
| 3812387 | 11/1988 | Fed. Rep. of Germany ...... 220/356 |
| 2115107 | 11/1970 | France . |
| 2576834 | 1/1985 | France . |
| 510902 | 1/1955 | Italy ........................ 220/357 |
| 1310508 | 6/1969 | United Kingdom . |
| 1388764 | 3/1975 | United Kingdom ............ 215/344 |

OTHER PUBLICATIONS

European Search Report, EP 87 30 4798 12/8/88.

*Primary Examiner*—William Price
*Attorney, Agent, or Firm*—William W. Haefliger

[57] ABSTRACT

A receptacle having a cover with a seal located between the cover and receptacle and flexible fins located on the interior of the receptacle and cover. The fins are deflected and the seal depressed in response to an article being squeezed between the cover and receptacle upon fastening the cover to the receptacle. External flexible finned protectors are provided for external corners and edges of an article.

27 Claims, 9 Drawing Sheets

SEALED CUSHIONING PACKAGE

BACKGROUND OF THE INVENTION

This invention relates generally to containers which firmly retain articles in position therein; more particularly it concerns a simple, rugged, article positioning container that is easily molded as a one-piece unit.

There is a continuing need for containers for articles requiring stability within the containers, and protection against damage due to shock loading, in transport. For example, magnetic tape cassettes require such stability and protection against shock loading. Prior containers have not, however, possessed the unusual advantages in construction, mode of operation and results as now afforded by the present container.

There is also need for containers which not only protect or cushion retained articles, but which are also sealed against external fluids access, such as water and air, and which prevent inadvertent dumping of their article contents when the containers are opened, as by cover and receptacle swinging open about a hinge location. Camera containers are an example.

SUMMARY OF THE INVENTION

It is a major object of the invention to provide an improved container meeting the above needs, and characterized by simplicity of construction in a one-piece, molded unit. Basically, the container comprises:

(a) a receptacle and a cover therefor, the receptacle having a bottom wall, and the cover having a top wall, (b) fin means integral with at least one of such walls and projecting toward the other wall to engage an article placed within the container and between the walls when the cover is closed onto the receptacle, (c) the fin means being yieldably deflectable in response to squeezing of the article between such walls, (d) and fastener means associated with the receptacle and cover to hold the cover closed on the receptacle with said article squeezed and thereby positioned with said fin means in deflected state, (e) the receptacle and cover having interfitting peripheral edge structures that provide a fluid seal and wherein the fastener means holds the cover closed on the receptacle and the article is squeezed by the fin means in deflected state.

As will be seen, the peripheral edge structure of one of the cover and the receptacle typically forms a peripheral groove, and the peripheral edge structure of the cover and receptacle forms a peripheral tongue that fits into said peripheral groove when the cover is closed on the receptacle. That groove may have inner and outer walls, to receive the peripheral tongue which fits between said walls and exerts force acting to deflect one of said walls.

Further, the tongue may have wedge fit between those walls or a yieldably compressible seal may be received in the groove between said walls to be compressively engaged by the tongue when the cover is closed on the receptacle.

Also, the cover and receptacle typically have interconnections at longitudinally spaced sides thereof, one interconnection comprising interfitting locking tab and recess elements, one on the cover and the other on the receptacle, the groove being intercepted by one of the tab and recess elements, the tab and recess elements comprising said fastener means. In this regard, the outer wall of the groove is typically interrupted along its length by the recess element, or elements, a wall gap or gaps formed by the interruption closed by a locking tab or tabs, when received in the recess or recesses.

It is a further object in the invention to provide outwardly looping bracket means on the cover and receptacle proximate said peripheral edge structures, said bracket means forming strap receiving openings located to be brought into registration as the cover and receptacle are closed together, whereby the receptacle may be prevented from falling away from the cover to spill the article from the receptacle when a strap is retained about a user's neck and passes through the bracket openings for retention of the bracket means on the receptacle. Said bracket means typically includes two pairs of brackets, one pair on the receptacle near corners thereof, and one pair on the cover near corners thereof.

The fin means may include fins that extend in generally parallel relation and are spaced apart in series across major extent of said one wall; and the cover typically has depth that gradually diminishes, relative to the fins, in one longitudinal direction, and the receptacle has depth that gradually increases relative to the fins in that longitudinal direction.

Further, the fins typically have terminal edges that define an article positioning plane relative to which said fin planes are out of perpendicularity; and such fins may be grouped to include first fins integral with said one wall, and second fins integral with the other of said walls, with article receiving space formed between the first fins and the second fins, when said cover is closed toward said receptacle. In addition, the first fins may extend in generally parallel relation, spaced apart in series across major extent of said one wall, and the second fins may extend in generally parallel relation, spaced apart in series across major extent of said other wall.

It is further object to provide the first fins with terminal edges defining a first article positioning plane relative to which the first fins are out of perpendicularity, and to provide the second fins with terminal edges defining a second article positioning plane relative to which the second fins are out of perpendicularity, such first and second planes being substantially parallel, for example. Typically, the first fins extend at angles between 75° and 88° relative to said first plane, and the second fins extend at angles between 75° and 88° relative to the second plane.

It is further object of the invention to provide such receptacle and cover with hinge connection, the cover, receptacle and hinge connection being a one-piece, molded plastic unit. In this regard, said cover and receptacle may have interconnections at longitudinally spaced sides thereof, one interconnection comprising a molded hinge, and the other interconnection comprising interfitting tongue and groove elements, one on the cover and the other on the receptacle, such elements having wedge interconnection.

As referred to, the article may comprise a camera, or other unit device, which is completely protectively enclosed, and sealed against external fluid access to the unit interior.

It is a further object to provide external, flexible finned protectors for external corners and edges of an article.

These and other objects and advantages of the invention, as well as the details of an illustrative embodiment, will be more fully understood from the following specification and drawings in which:

DETAILED DESCRIPTION

Figure 8:
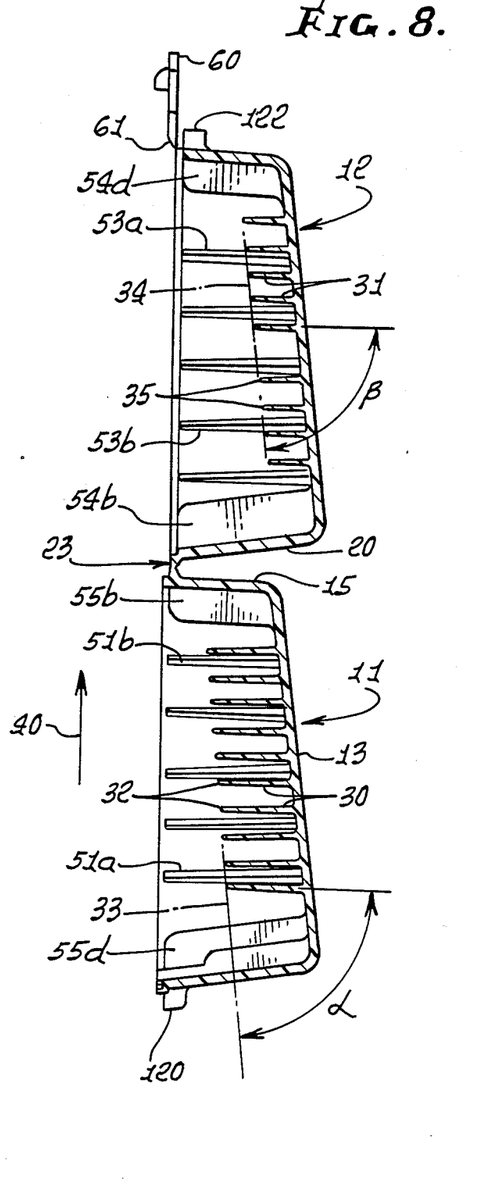
FIG. 8 is a section, in elevation taken on lines 8—8 of FIG. 7.
Figure 9:
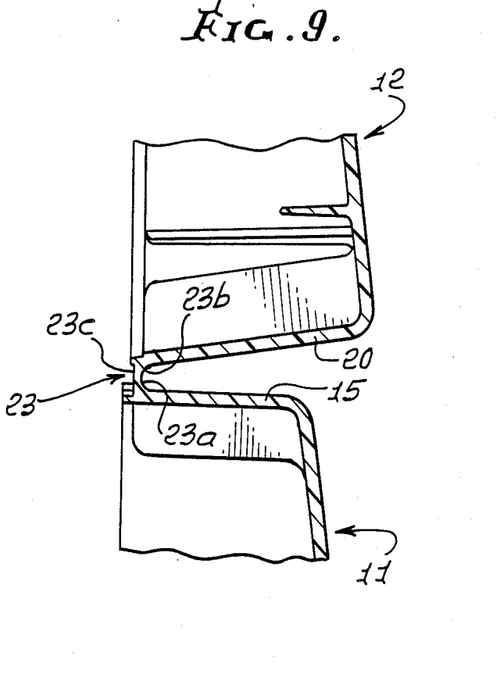
FIG. 9 is an enlarged fragmentary section taken on lines 9—9 of FIG. 7.

In the drawings, the container 10 comprises a receptacle 11 and a cover 12 therefor; the receptacle has a bottom wall 13, opposite longitudinally spaced side walls 14 and 15, and opposite laterally spaced end walls 16 and 17, and the cover has a top wall 18, opposite side walls 19 and 20, and opposite end walls 21 and 22. The container and cover typically have one-piece, molded plastic construction, with integrally molded hinge interconnection at 23. The thin-walled, molded plastic hinge 23 interconnects walls 15 and 20, and is clear from FIGS. 8 and 9, and it has two tapered extents 23a and 23b, with their thinnest extents interconnected at 23c. The hinge is elongated in a lateral direction, parallel to walls 15 and 20.

Figure 1:
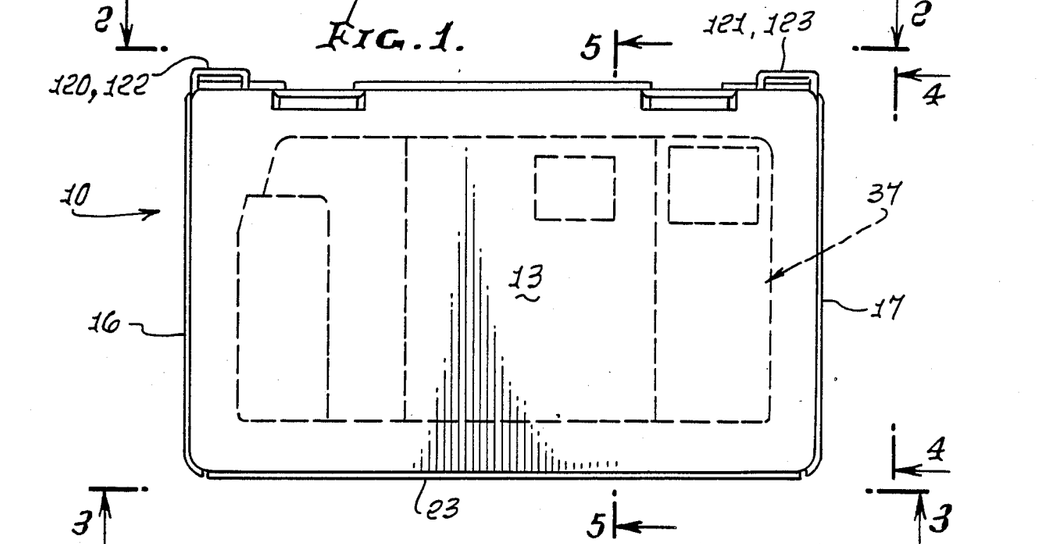
FIG. 1 is a bottom plane view of a closed container incorporating the invention.
Figure 2:
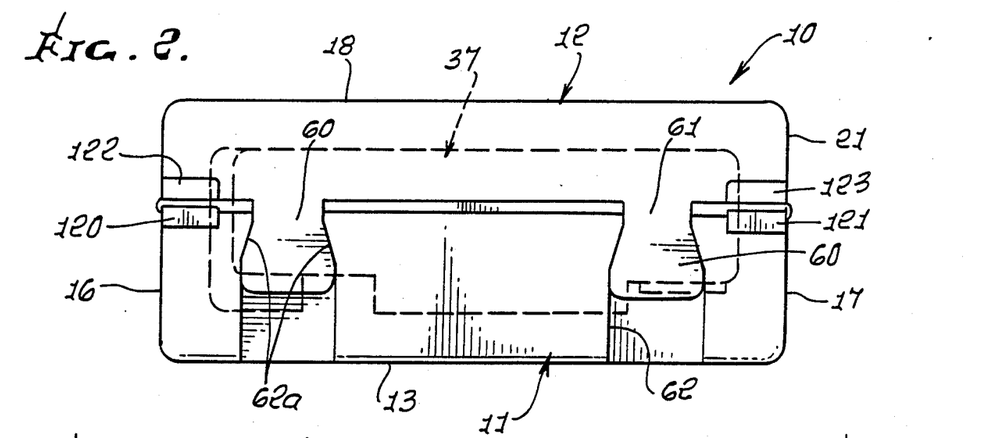
FIG. 2 is a side elevation taken on lines 2—2 of FIG. 1.
Figure 3:
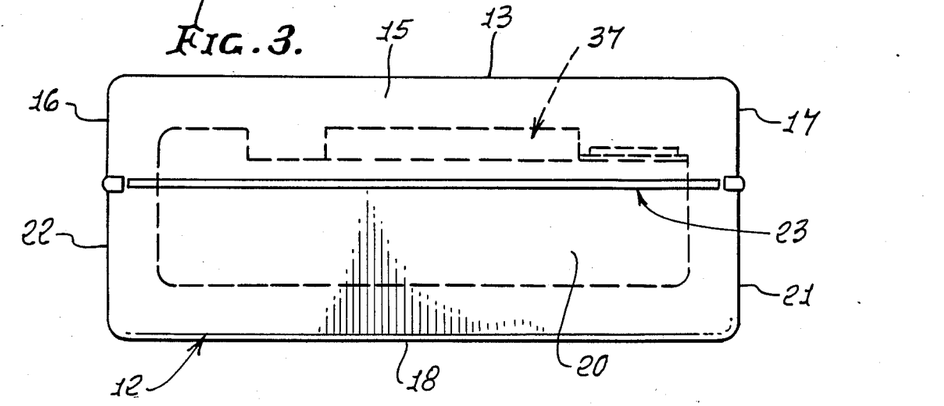
FIG. 3 is a side elevation taken on lines 3—3 of FIG. 1.
Figures 4, 5, 6:
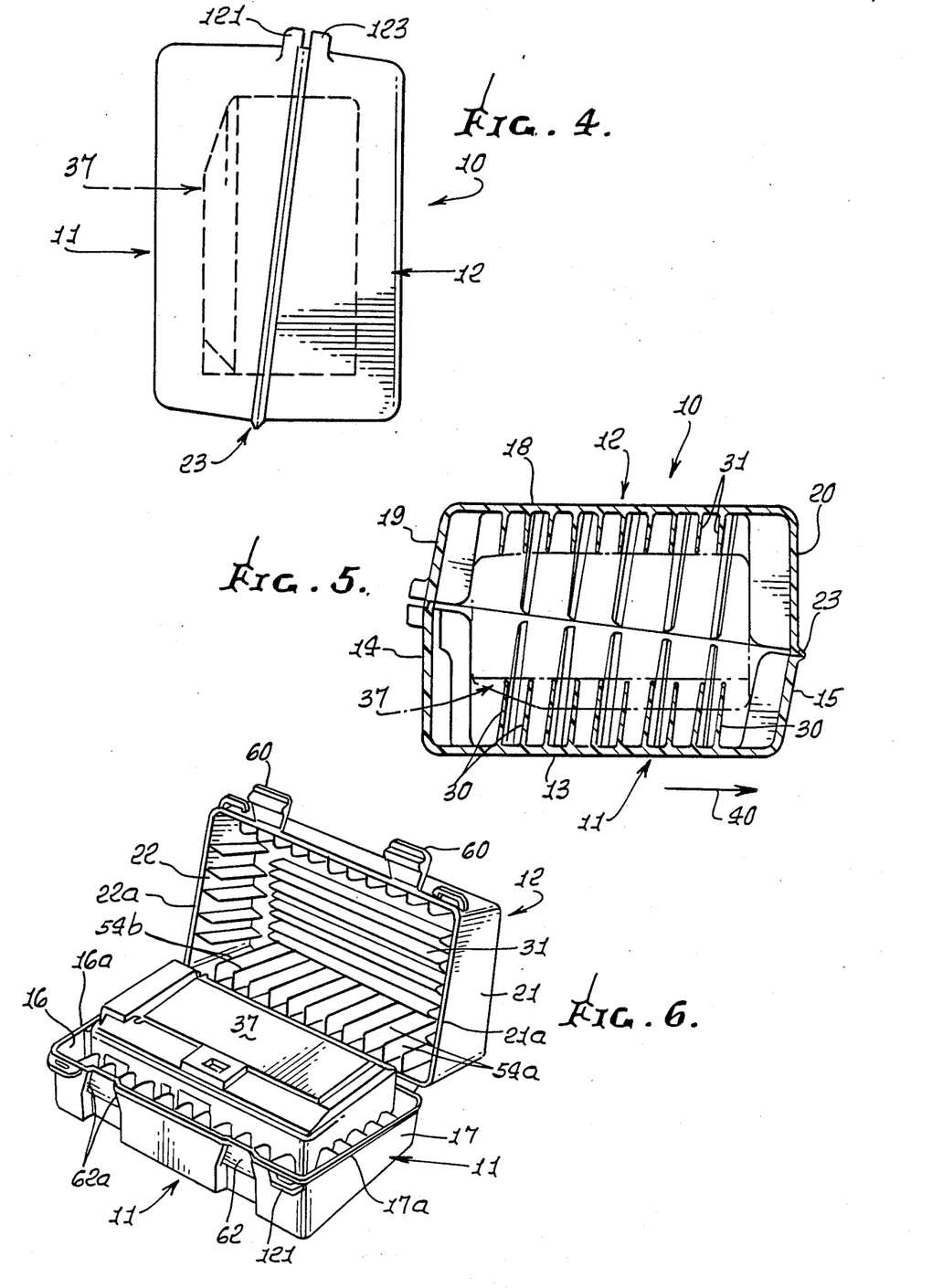
FIG. 4 is an end elevation on lines 4—4 of FIG. 1.
FIG. 5 is a section on lines 5—5 of FIG. 1.
FIG. 6 is a perspective view of the FIG. 1 container, in open condition.
Figure 12:
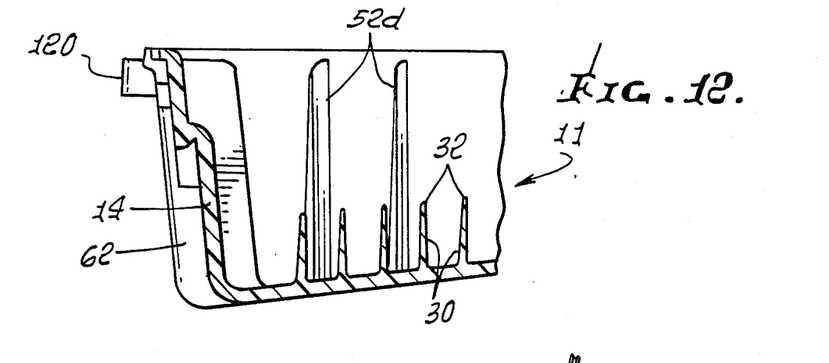
FIG. 12 is an enlarged fragmentary section taken on lines 12—12 of FIG. 7.

Fin means are provided to be integral with at least one of the top and bottom walls 18 and 13, and to project toward the other of such walls to engage an article placed within the container and between the walls when the cover is closed onto the receptacle, the fin means being yieldably deflectible in response to squeezing of the article between the walls. In the example, the fin means include first fins 30, integral with one wall, such as receptacle bottom wall 13; and second fins 31, integral with the one wall, such as cover top wall 18. The first fins 30 extend in parallel, or substantially parallel, planes, and have terminal edges 32 that define an article positioning plane, or planes 33, relative to which the first fins are slightly out of perpendicularity; thus, the fins extend in lateral, upright parallel planes that extend at an angle $\alpha$ between 75° and 88° relative to plane 33; and the second fins 31 also extend in lateral, upright, parallel planes that extend at an angle or angles $\beta$ between 75° and 88° relative to an article positioning plane 34 defined by their terminal edges 35—i.e. fins 31 are slightly out of perpendicularity relative to plane 34. Such fins typically taper toward their edges 35, as is clear from FIGS. 12 and 13, to enhance their flexibility, near such edges, which typically engage and position the retained and positioned article, as for example a camera an example of which is seen at 37 in FIGS. 5 and 6. Note also that the fins extend at correspondingly slight angles $\alpha$ and $\beta$ relative to the planes of walls 13 and 18, the article 37 extending parallel to those walls (see FIG. 5).

The receptacle, furthermore, has depth that gradually diminishes, relative to its fin height, in one longitudinal direction (see arrow 40 in FIGS. 5 and 8); and the cover has depth that also gradually increases relative to its fin height in that direction 40, in closed condition of the receptacle and cover. This enables the fin arrangement combination, as shown and described, in a highly compact container, with yieldable article cushioning and positioning fins. Note in this regard, the tapering end walls 16 and 17 with tapering edges 16a and 17a and tapering end walls 21 and 22 with tapering edges 21a and 22a.

Also provided are flexible auxiliary fins 50a and 50b, and 51a and 51b in the receptacle, and 52a and 52b, and 53a and 53b in the cover, proximate the tapered end walls as described, to position the edges of the article 37, and to slightly (flex) yield if necessary, to cushion the article nested therebetween. Fins 50a and 51a are inclined toward wall 14; fins 50b and 51b are inclined toward wall 15; fins 52a and 53a are inclined toward wall 19; and fins 52b and 53b are inclined toward wall 20. This assures that fin deflection tends to center the camera in the container. See also auxiliary fins 54a and 54b proximate wall 20; 54c and 54d proximate wall 19; 55a and 55b proximate wall 15; and 55c and 55d proximate wall 14, having similar side cushioning functions. All of such fins 50-55 project toward edges of the nested and positioned article 37.

Fastener means is associated with the receptacle and cover to hold the cover closed on the receptacle with the article squeezed by the fins, and thereby positioned with the fin means in deflected state. The fastener means advantageously may comprise interfitting tab and recess elements, one on the cover and the other on the receptacle. See for example, the integral flat plastic tabs 60 having integral, folding hinge connections at 61 to the cover wall (see FIG. 7), and recesses 62 defined by and in receptacle wall 14. The tabs and recesses are shown to have interfitting wedge shape, to retain the cover closed on the receptacle, yet allow ready pull-out of the tabs, from closed, flush positions, when the cover is to be opened. See tapered edges 60a of the tongue, and tapered walls 62a of the grooves. The tabs have edges that interfere with the inner edges of the recesses, frictionally, to retain the tabs in flush, closed position, acting to lock the container closed.

Figure 10:
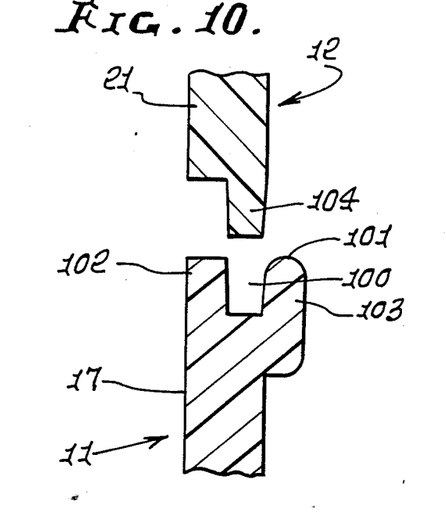
FIG. 10 is an enlarged fragmentary section taken on lines 10—10 of FIG. 7.

FIG. 10 shows the receptacle and cover as having interfitting peripheral edge structures that provide a fluid seal when the fastener means holds the cover closed on the receptacle and the article is squeezed by the fin means in deflected state. In this regard, the interfitting edge structure of one of the cover and receptacle forms a peripheral groove, and the peripheral edge structure of the other of the cover and receptacle forms a peripheral tongue that fits said peripheral groove when the cover is closed on the receptacle.

Figure 11:
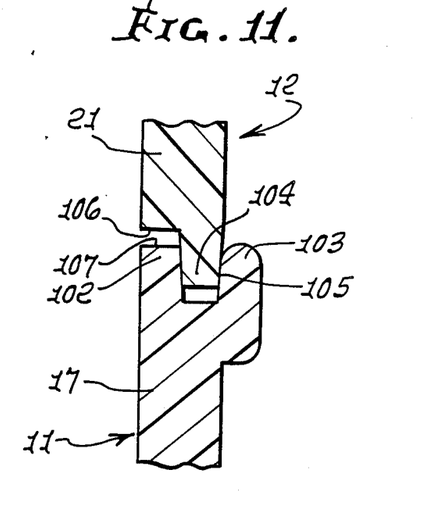
FIG. 11 is a view like FIG. 10, but showing the tongue on the cover received into a sealing groove on the receptacle.

In the example, the peripheral groove 100 in the peripheral edge 10 of the receptacle 11 has inner and outer walls 102 and 103, that taper slightly downward; and the peripheral tongue 104 fits between those walls and exerts force acting to deflect at least one of the walls, providing a peripheral seal as at 105, about the rectangular looping extent of the container, i.e., the cover and receptacle. See FIG. 11. Edge 106 on the cover engages edge 107 on the receptacle to limit interfit of 104 in 100.

Figure 11A:
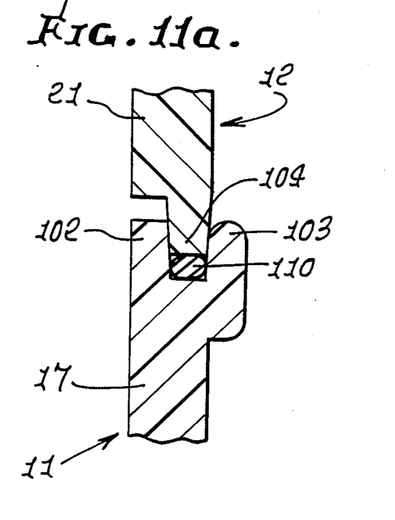
FIG. 11a is a view like FIG. 11 showing a modification.

FIG. 11a shows a variation, wherein a looping, yieldably compressible seal 110 (such as an elastomer or rubber O-ring) is received in the groove between walls 102 and 103 to be compressed by the tongue when cover is closed on the receptacle. Extra additional sealing effect is thereby achieved. O-ring 110 is in the form of a continuous loop, extending rectangularly about or within the channel or groove 110, at the receptacle peripheral edge.

Figure 7:
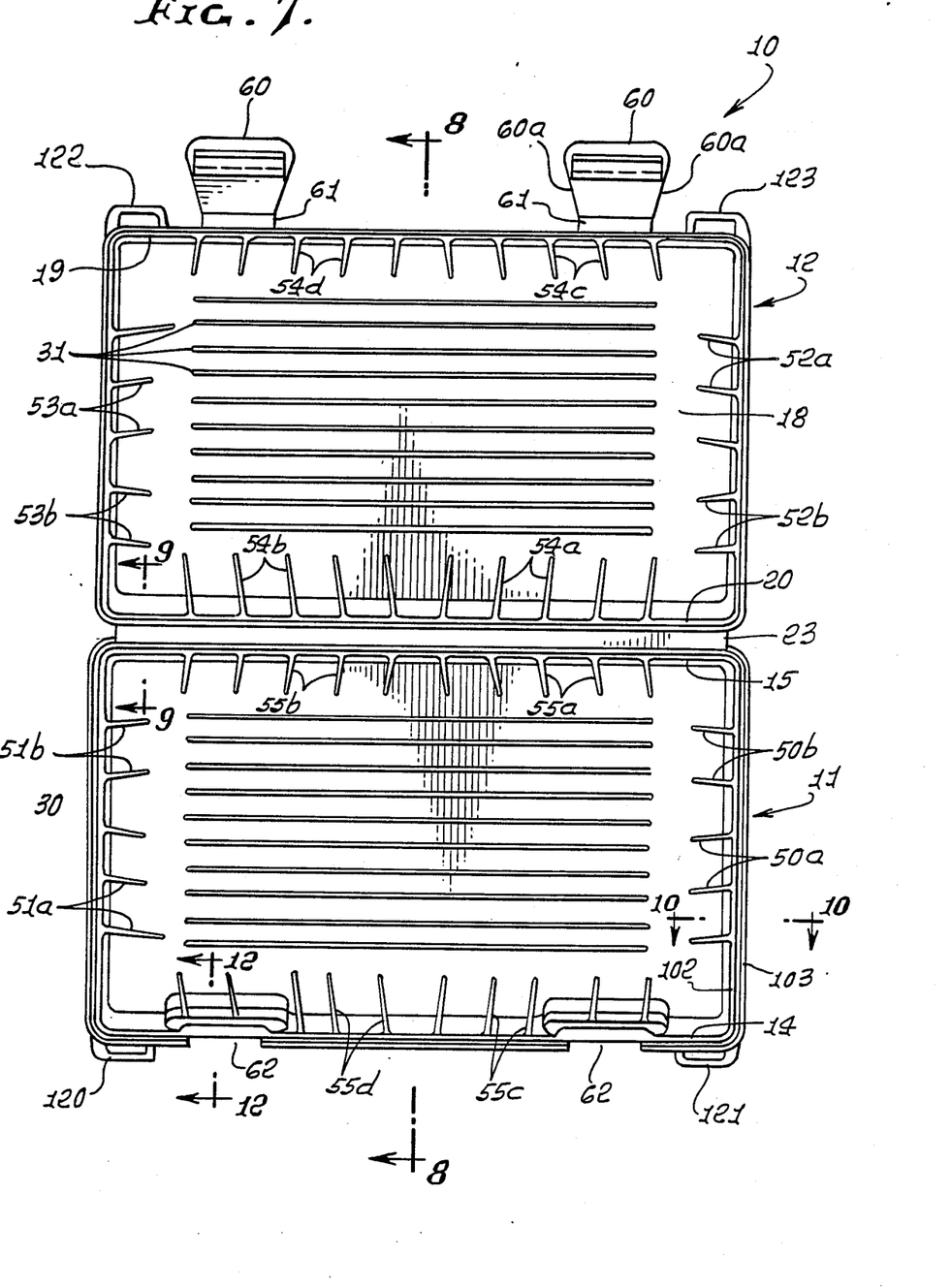
FIG. 7 is a plan view showing the interior of the receptacle and cover of the opened container.
Figure 11B:
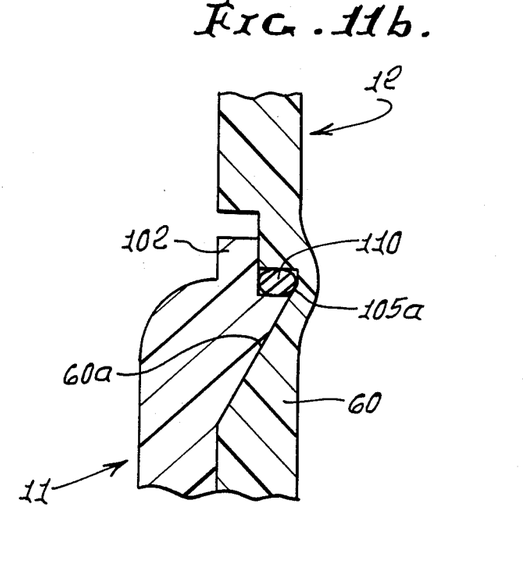
FIG. 11b is like FIG. 11a, but showing a locking tab element closing a groove interruption.

Note in FIG. 7 that the outer wall 103 of the groove 100 is intercepted or interrupted by the two recesses 62, inner wall 102 remaining intact. Thus, the outer wall has gaps therein at the recess locations. Those gaps are closed, as seen in FIG. 11b, by the flat tabs 60 in closed position; i.e. the tabs have inner sides 60a that act as substitute outer walls at the gap locations, to compress the seal 110, so that sealing effect is maintained at 105a against deformed O-ring 110, providing continuous sealing around the container.

Figure 13:
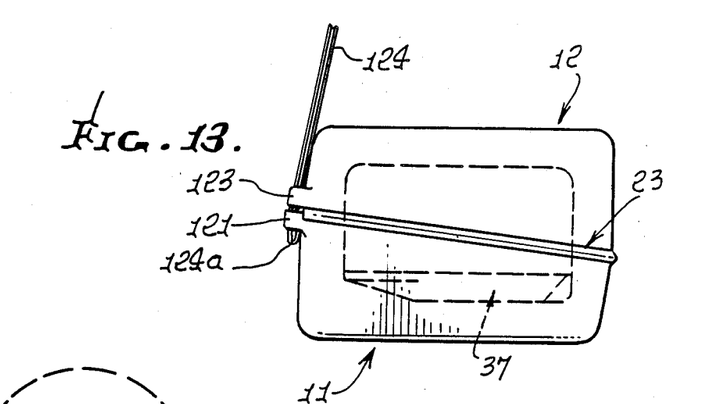
FIG. 13 shows a support strap supporting the container via looping brackets.
Figure 14:
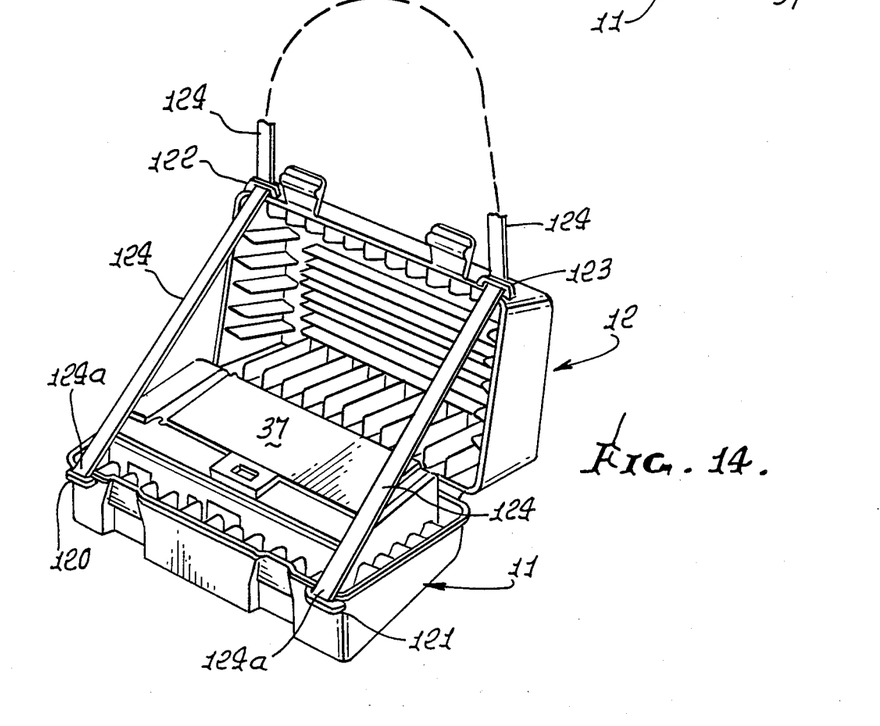
FIG. 14 is like FIG. 13, but shows the container opened up and also belt supported.
Figure 15:
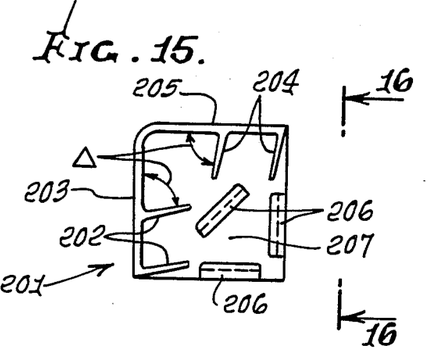
FIG. 15 is an enlarged fragmentary view showing a corner protector for a case or article.
Figure 16:
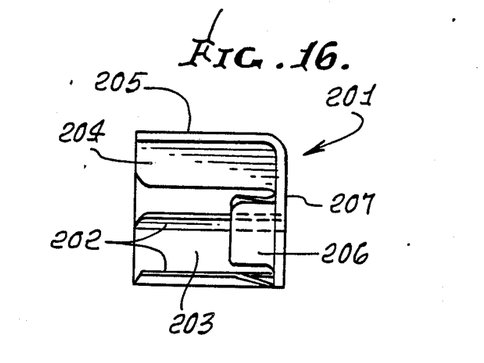
FIG. 16 is an end view on lines 16—16 of FIG. 15.
Figure 17:
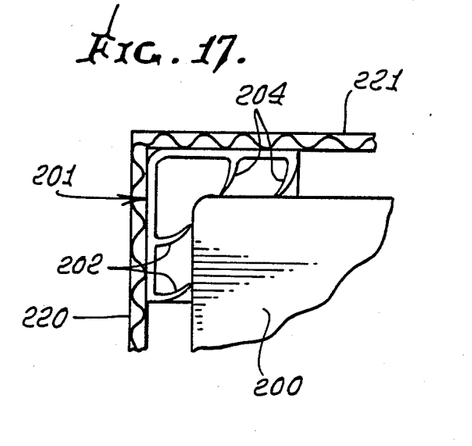
FIG. 17 is a view like FIG. 15, but showing impact of an article corner, against fins protecting the case corner.
Figure 18:
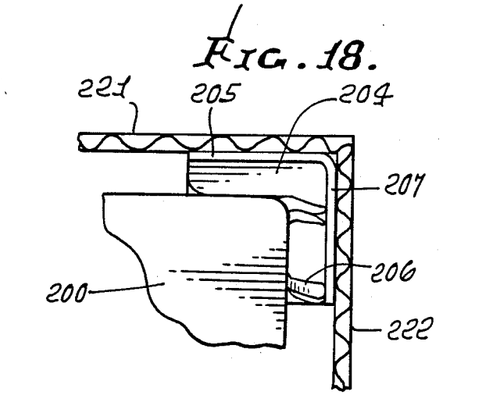
FIG. 18 is a view like FIG. 16, showing impact of the article corner impacting the fins.

FIGS. 13-14 illustrate the provision and use of looping brackets 120, 121, 122, and 123 to direct a strap 124 to hold the receptacle in horizontal position when opened, preventing dumping of a received article, such as a camera, from the container. Note in FIG. 13 the registration of openings in 120 and 122, and 121 and 123, in closed position of the container. The strap lower ends 124a are retained below or to brackets 120 and 121; the strap arms extend through openings in 120 and 122, and 121 and 123, and extend over the wearer's neck, and the cover 12 seats flatly against the user's chest.

FIGS. 15-19 show application of the invention to corners of an article 200 to be protected. Corner protectors 201 are suitably retained or attached to the article, as by the walls 220, 221 and 222 of a carton receiving the article 200 and protectors 201 at carton corners. Note fins 202 on wall 203, fins 204 on wall 205, and fins 206 on wall 207. The three walls are spacially related as follows:

wall 203 perpendicular to walls 205 and 207
wall 205 perpendicular to walls 203 and 207
wall 207 perpendicular to walls 203 and 205

Figure 19:
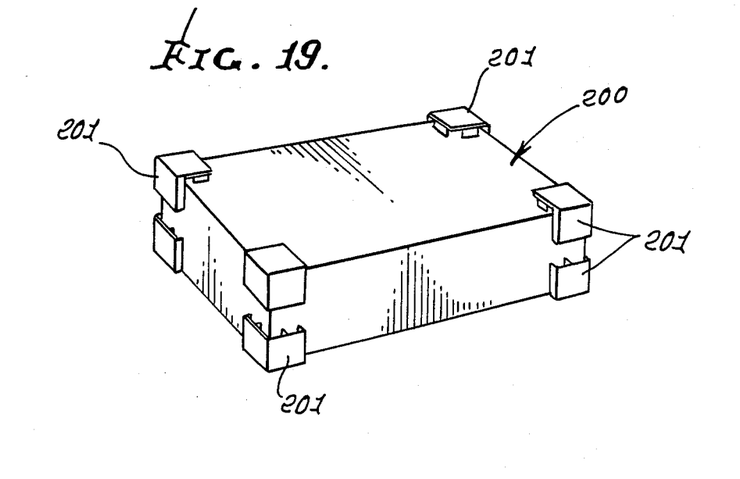
FIG. 19 is a perspective view showing protective cushions applied to the case exterior corners.
Figure 20:
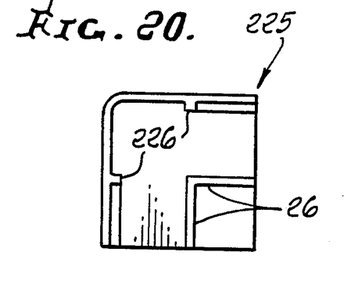
FIG. 20 is a section showing a modified corner piece.
Figure 21:
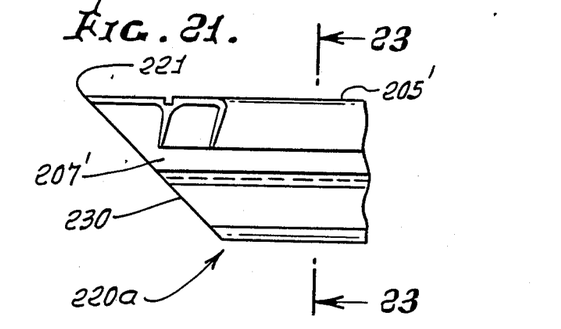
FIGS. 21 and 22 show diagonally formed protective end pieces that fit together in the FIG. 20 corner piece.
Figure 22:
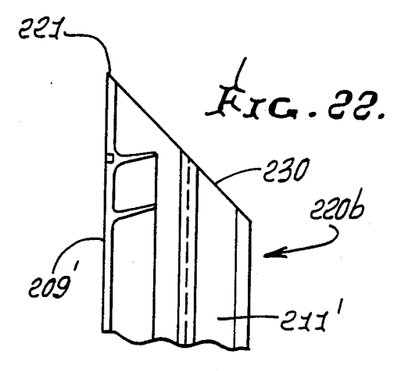
Figure 23:
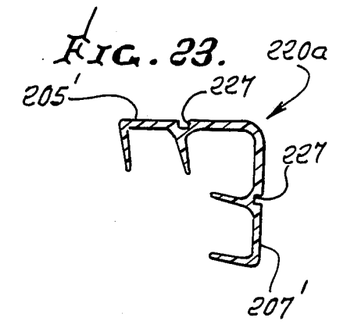
FIG. 23 is a section on lines 23—23 of FIG. 21.
Figures 24, 25:
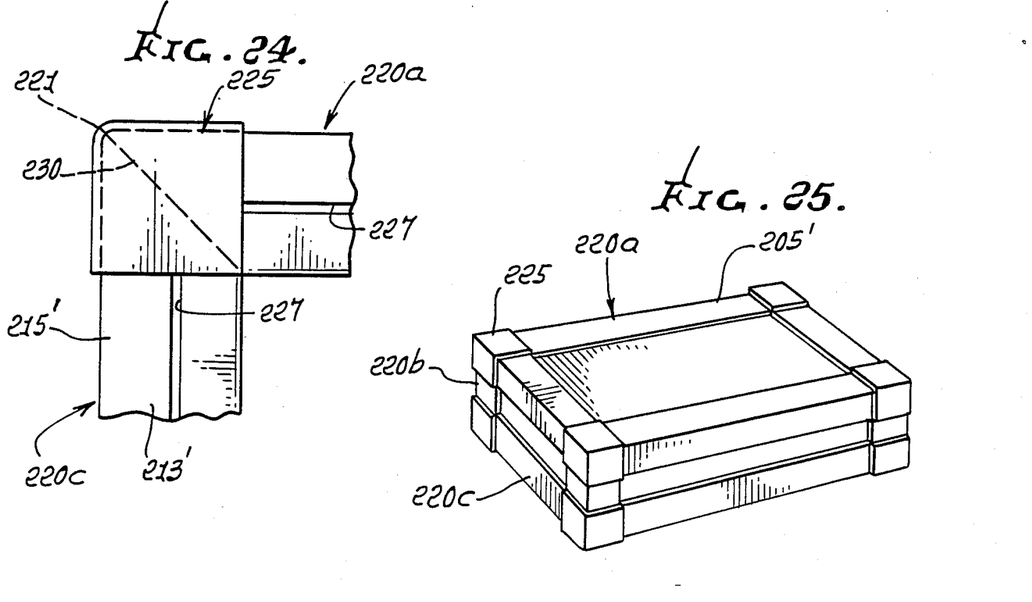
FIG. 24 is a view showing assembly of the FIGS. 21 and 22 protector in a corner piece of FIG. 20 construction.
FIG. 25 shows a case like that of FIG. 19, but with protected corners of FIGS. 20-24 type, assembled to edge protect the case or article.
Figure 26:
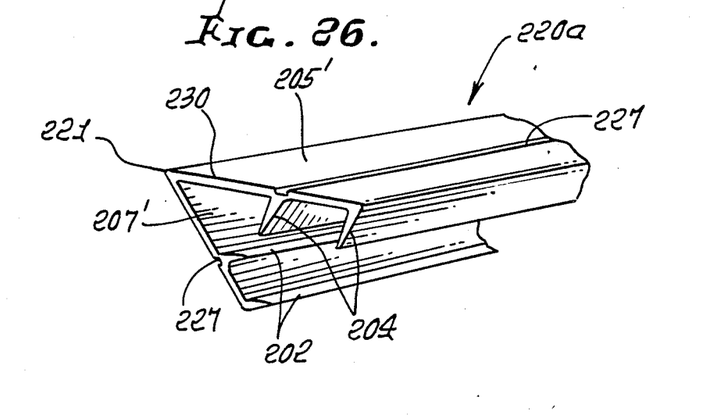
FIG. 26 is a perspective view of the FIG. 23 part.

Undeflected fins 202 extend in planes angled at angles $\Delta$ relative to wall 203; undeflected fins 204 extend in plane angled at angles $\Delta$ relative to wall 205; and undeflected fins 206 extend in planes angled at angles $\Delta$ relative to wall 207. Angles $\Delta$ are between 75° and 88°. The article 200 engages the tips of the tapered fins or ribs, and bends them (to be cushioned) should the protector or protectors be impacted, as by dropping of the assembly and carton on the ground. FIG. 19 shows protectors 201 at each corner of the article for reception into a retaining carton. The tips of the fins may be initially bent when the protectors are received in the carton for take-up of any looseness in packing.

FIGS. 20-26 show modified protectors, each with two walls diagonally split (see diagonal 230 for example) to form three like L-shaped parts 220a, b and c elongated and with two walls tapering toward the common corner 221. The parts extend orthogonally.

TABLE

Part 220a includes walls 205' and 207'
Part 220b includes walls 209' and 211'
Part 220c includes walls 213' and 215'

Corner pieces 225 are guidedly attached to the outer surfaces of the six listed walls, proximate each corner. Note interior linear tongues 226 in each corner piece slidably received endwise in exterior linearly elongated grooves 227 formed in the walls 205', 207', 209', 211', 213', and 215'. Thus, a cushioning framework is provided about the block article 200, i.e., along edges thereof. Fins on parts 220a, b, and c remain as described in FIGS. 15-19. Corner pieces 225 do not contain fins.

The fins and walls in FIGS. 15-19 typically comprise a single plastic unit, and the corner pieces and elongated parts in FIGS. 20-25 define a plastic unit or frame, receivable in a carton.

An article, such as a camera, received in the internally finned case, or in the FIG. 15-25 protectors, as described, typically resiliently deflects the fin tips on all finned sides, when the article to be protected is packaged, as described.

Figure 27:
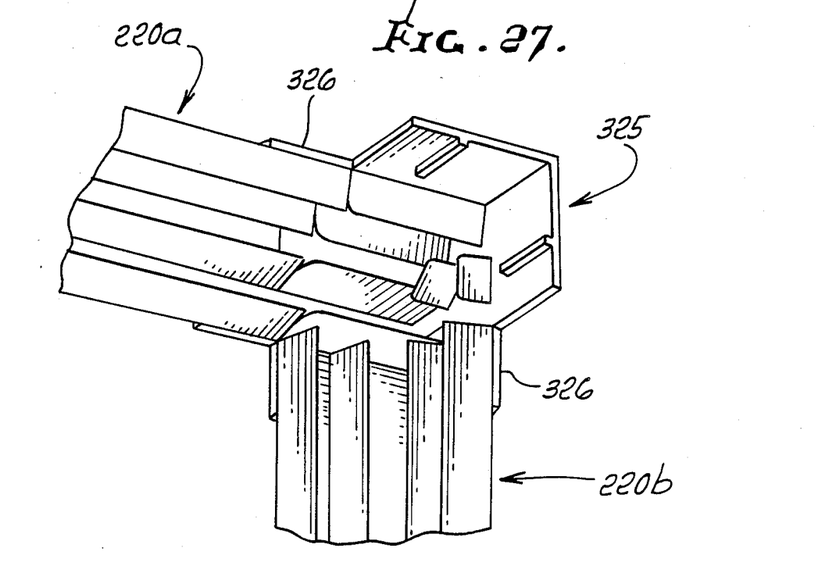
FIG. 27 is a perspective view of a modification.

The unit seen in FIG. 27 is like that of FIGS. 20-26, except that the tapered ends are omitted, and the walls of each part 220a, b, and c terminate in a plane normal to such walls. Corner pieces 325 are like 225, but have internal fins as in FIGS. 15-18 to line-up with the fins in the parts 220a-220c. Extensions 326 on the corner piece walls retain and interfit the ends of parts 224a-220c.

I claim:
1. A container, comprising
   (a) a receptacle and a cover therefore, the receptacle having a bottom wall and the cover having a top wall,
   (b) fin means integral with at least one of said walls and projecting toward the other of said walls to engage an article placed within the container and between said walls when the cover is closed onto the receptacle,
   (c) said fin means being yieldably deflectable in response to squeezing of the article between said walls,

(d) and fastener means associated with the receptacle and cover to hold the cover closed on the receptacle with said article squeezed and thereby positioned with said fin means in deflected state, (e) the receptacle and cover having interfitting peripheral edge structures that provide a fluid seal when the fastener means holds the cover closed on the receptacle and the article is squeezed by the fin means in deflected state, (f) the peripheral edge structure of one of the cover and receptacle typically forming a peripheral groove, and the peripheral edge structure of the other of the cover and receptacle forming a peripheral tongue that fits into said peripheral groove when the cover is closed on the receptacle, (g) the peripheral groove having inner and outer walls, and including a yieldably compressible seal received in the groove between said walls to be compressively engaged by the tongue when the cover is closed on the receptacle, (h) the cover and receptacle having interconnections at longitudinally spaced sides thereof, one interconnection comprising a molded hinge, and the other interconnection comprising interfitting locking tab and recess elements, one on the cover and the other on the receptacle, the groove being intercepted by one of the tab and recess elements, the tab and recess elements comprising a fastener means, (i) the outer wall interrupted by said recess element, the outer wall having a gap therein where it is interrupted by the recess element, and the tab element closing said gap when the tab is received in the recess, (j) the tab compressing the seal at the location of the gap.

2. The container of claim 1 wherein the peripheral tongue fits between said walls and provides means for exerting force acting to deflect one of said walls.

3. The container of claim 2 wherein the peripheral groove inner and outer walls are closely spaced apart so that the tongue has wedge fit between said walls when the cover is closed on the receptacle.

4. The container of claim 1 wherein said seal comprises an elastomer O-ring, the groove having approximately rectangular outline.

5. The container of claim 1 wherein the outer wall is interrupted at two spaced locations by two of said recess elements.

6. The container of claim 10 wherein said outer wall has two gaps therein where it is interrupted by the two recess elements, there being two of said tab elements closing said gaps when the tabs are received in the respective recesses, both tabs then acting to compress the seal.

7. The container of claim 1 including outwardly looping bracket means on the cover and receptacle proximate said peripheral edge structures, said bracket means forming strap receiving openings located to be brought into registration as the cover and receptacle are closed together, whereby the receptacle may be prevented from falling away from the cover to spill the article from the receptacle when a strap is retained about a user's neck and passes through the bracket openings for retention to the bracket means on the receptacle.

8. The container of claim 7 wherein the bracket means includes two pairs of brackets, one pair on the receptacle near corners thereof, and one pair on the cover near corners thereof.

9. The container of claim 8 wherein the receptacle and cover consists of molded plastic material, and said brackets are integrally molded to the receptacle.

10. The container of claim 8 wherein the peripheral edge structure of one of the cover and receptacle typically forms a peripheral groove, and the peripheral edge structure of the other of the cover and receptacle forms a peripheral tongue that fits into said peripheral groove when the cover is closed on the receptacle, and wherein the peripheral groove has inner and outer walls, and including a yieldably compressible seal received in the groove between said walls to be compressively engaged by the tongue when the cover is closed on the receptacle, the tab and recess elements located between the brackets.

11. The container of claim 1 wherein said fin means comprise fins having terminal edges that define an article positioning plane relative to which said fin planes are out of perpendicularity, certain fins inclined toward one wall of the container, and other fins inclined toward another wall of the container.

12. The container of claim 11 wherein said fin means are spaced apart in series across major extent of said one wall.

13. The container of claim 11 wherein said fins extend in generally parallel relation, laterally, said cover having depth that gradually diminishes, relative to the fins, in one longitudinal direction, and said receptacle having depth that gradually increases relative to the fins in said one longitudinal direction.

14. The container of claim 11 wherein said fin means include first fins integral with said one wall, and second fins integral with the other of said walls, there being article receiving space formed between said first fins, and said second fins, when said cover is closed toward said receptacle.

15. The container of claim 14 wherein said first fins extend in generally parallel relation and are spaced apart in series across major extent of said one wall, and said second fins extend in generally parallel relation and are spaced apart in series across major extent of said other wall.

16. The container of claim 14 wherein said first fins are generally parallel, laterally, and said second fins are generally parallel, laterally, said cover having depth that gradually diminishes, relative to the fins integral with the cover, in one longitudinal direction, and said receptacle having depth that gradually increases, relative to the fins carried by the receptacle, in said longitudinal direction.

17. The container of claim 14 wherein said first fins have terminal edges defining a first article positioning plane relative to which said first fins are out of perpendicularity, and said second fins have terminal edges defining a second article positioning plane relative to which said second fins are out of perpendicularity.

18. The container of claim 17 wherein said first and second planes are substantially parallel.

19. The container of claim 17 wherein said first fins extend at angles between 75° and 88° relative to said first plane, and said second fins extend at angles between 75° and 88° relative to said second plane.

20. The container of claim 14 including said article having sides thereof compressively engaged by deflected fins.

21. The container of claim 20 wherein said article comprise a camera.

22. The container of claim 1 wherein said receptacle and cover have hinge connection, the cover, receptacle and hinge connection being a one-piece, molded plastic unit.

23. The container of claim 1 including said article which comprises a camera having a side thereof compressively engaged by deflected edges defined by the fin means.

24. The container of claim 11 wherein said tab and recess elements are defined by molded plastic material, and have interlocking wedge shape.

25. A protector for an article defining at least one elongated edge and at least one corner, comprising, in combination with said article, (a) said protector having two walls adapted to overlap two sides defined by the article,
(b) and fins integral with said two walls and projecting to have tips engageable with said two sides of the article, said fins angled to flex when pushed toward and against the article,
(c) said protector being substantially smaller than the article and being entirely confined closely against one of the following:
  (i) said elongated edge
  (ii) said corner 26. The protector of claim 25 wherein said walls and fins define a single plastic unit.

27. The protector of claim 25 wherein said walls have ends that define diagonals extending toward a common corner.

* * * * *